Oct. 11, 1938.  D. L. RAITT  2,132,803
CHAIN
Filed Feb. 9, 1937

INVENTOR
David L. Raitt
BY
ATTORNEY

Patented Oct. 11, 1938

2,132,803

UNITED STATES PATENT OFFICE 2,132,803

CHAIN

David Ley Raitt, London, England

Application February 9, 1937, Serial No. 124,897
In Great Britain February 14, 1936

3 Claims. (Cl. 59—80)

This invention relates to chains and has for an object to provide an improved form of chain suitable for various purposes.

Another object of the invention is to provide an improved form of chain which is particularly suitable for suspending electric light fittings, provision being made for the flexible conductors to the fitting to pass through the chain. The chain may however be used for various other purposes and the invention is therefore not restricted to this application.

A chain, in accordance with the invention, comprises a number of tubular elements flexibly connected end to end by relatively short links. The tubular elements may be of any suitable cross-section such as square, round, hexagonal or the like and may be formed in any suitable manner. The connecting links may be formed from wire or strip material and adjacent tubular elements may be connected together by a single closed or almost closed link or by two or more pieces connected at each end to the tubular elements.

Various other objects and advantages will be apparent from the following description of embodiments of the invention and the novel features will be particularly pointed out in connection with the appended claims.

Figure 1:
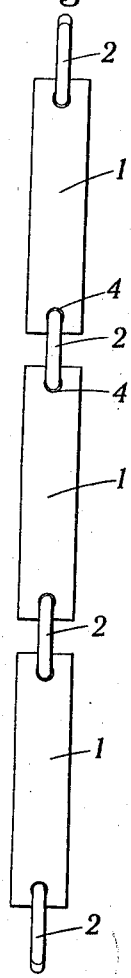
Figure 2:
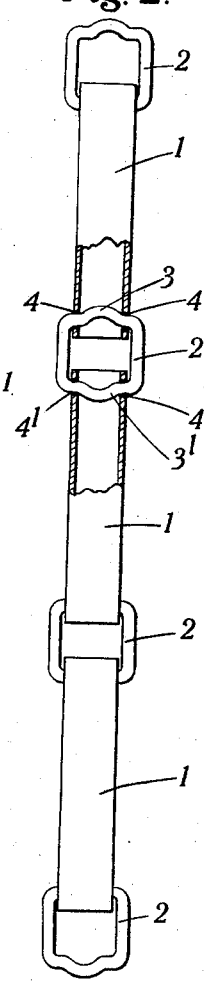
Figure 4:
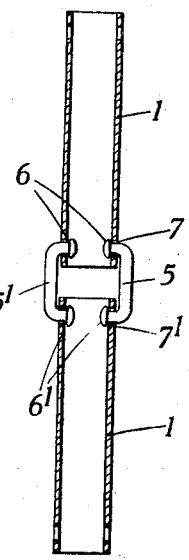
Figure 6:
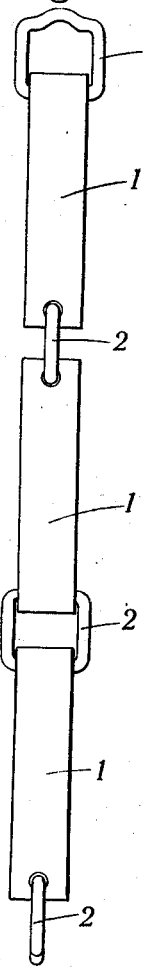
Figure 5:
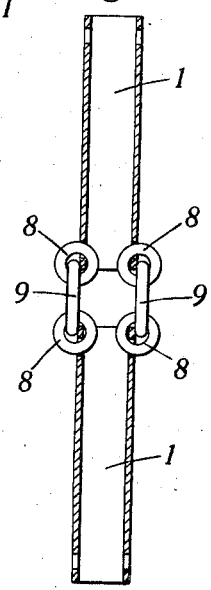
Figure 3:
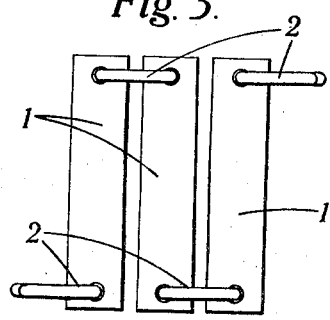
Figure 7:
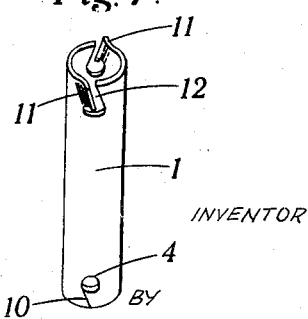

In the accompanying drawing,

Figures 1 and 2 represent views at right angles to one another of one form of chain in accordance with the invention, Figure 3 represents the chain shown in Figures 1 and 2 in the folded position, Figures 4, 5 and 6 represent modified forms of the chain, and Figure 7 represents a perspective view of one element of the chain.

In the form shown in Figures 1 and 2 a number of lengths of tube 1 of circular cross-section are joined together by closed links 2 formed from wire bent into a square. One end 3 of each link passes through diametrically opposed holes 4 formed in a tube 1 and the opposite end 3' of the link passes through diametrically opposed holes 4' formed in the adjacent tube. The tubes 1 are free to pivot about the ends of the link 2 which is of such a size that adjacent tubes 1 can be moved to lie adjacent to one another as in Figure 3 so that the chain can be folded easily.

In another form of the chain shown in Figure 4, adjacent tubular elements 1 are joined by two lengths of wire 5, 5'. One end 6 of each wire 5, 5' is pivotally connected to a length of tube 1 towards one end thereof and the other end 6' of each wire 5, 5' is pivotally connected to an adjacent length of tube. The ends 6, 6' of the wire are passed through holes 7, 7' in the tubes and the ends of the wires are upset to form heads to hold the wire in position. The ends 6, 6' of the wires may be bent back instead of having heads formed on them, as shown. Two wires 5, 5' connect each adjacent pair of tubes 1 and are placed diametrically opposite to one another.

In yet another form of chain, shown in Figure 5, small circular links 8 are attached to the ends of the tubes 1 and adjacent tubes are joined by closed links 9 passing through the circular links 8 on the adjacent tubes.

In the form shown in Figures 1 to 4 the links are connected to the tubular elements so as to lie in one plane, giving flexibility to the chain in one direction. In the modified form shown in Figure 6 alternate links 2 are connected to the tubular elements 1 so as to lie in planes at right angles to one another thereby giving flexibility in two directions.

In all forms of chain according to the invention, the tubular elements 1 may be of any suitable cross-section such as square, hexagonal, oval, or circular and the elements in a chain may all be of the same cross-section or may be of different cross-sections at different parts of the chain. The tubular elements may also be formed in any suitable manner as for example by drawing to form a seamless tube, by skelping or by joining a number of pieces by clips or the like.

The links may also be formed in various ways and may take various forms. They may be closed links of various shapes or may be wires or strips. A series of links may be used to connect the adjacent tubular elements together.

In one method of making the chain, diametrically opposed holes 4 are drilled towards the ends of the tube 1 and cuts 10 are made from the end of the tube into each hole (preferably tangentially to the circumference of the hole as shown at the lower part of Figure 7) leaving narrow necks 11 of material between the holes and the end of the tube. The necks are bent back as shown at the top of Figure 7 so that slots 12 are formed in the end of the tube by which the link 2 can be inserted into the holes 4. The material is then bent back to hold the link in position. Successive tubes and links are joined in this manner to form the flexible chain. By this means the chain can be readily assembled but it is to be understood that many other methods may be used to assemble the chain.

The chain is preferably made up of metal tubes and metal links but other materials may be used without departing from the scope of this invention.

It will be seen that the chain formed in accordance with the invention is particularly suitable for use in suspending electric light fittings. The flexible conductors to the fitting may be passed through the tubular elements which hide them from view and also protect them against damage.

It will be understood that such modifications may be made in the preferred forms described above as come within the broad idea underlying the invention and that the invention is therefore not restricted to the details of these preferred forms.

I claim:

1. A chain comprising a plurality of tubular elements, and links connecting each tubular element at each end to adjacent tubular elements, alternate links being arranged to pivot about parallel axes and adjacent links being arranged to pivot about perpendicular axes.

2. A chain comprising a plurality of tubular elements, each element having diametrically opposed holes within the length of and adjacent the ends of the walls of the element and links of a reduced length relative to the length of the elements and connecting said elements in series, the ends of each link passing through the holes in the walls of adjacent tubular elements to form parallel pivotal connections between the links and the adjacent elements, the axes of the pivotal connections between some of the other links and the elements adjacent thereto being perpendicular to the axes of the pivotal connections between the rest of the links and the elements adjacent thereto.

3. A chain comprising a plurality of tubular elements, each element having diametrically opposed holes within the length of and adjacent the respective ends of its walls, and links of reduced length relative to that of the elements and connecting such elements in series, the ends of each link passing through the holes in the walls of adjacent tubular elements to form parallel pivotal connections between the link and these adjacent elements, the axes of the pivotal connections between any one link and its immediately adjacent elements being perpendicular to the axes of the pivotal connections between such elements and the links connecting such elements to succeeding elements in the chain formation.

DAVID LEY RAITT.